(12) United States Patent
Buckl et al.

(10) Patent No.: US 9,851,231 B2
(45) Date of Patent: Dec. 26, 2017

(54) FLOW METER AND HEAT METER THAT AUTOMATICALLY DETERMINES FLOW DIRECTION

(71) Applicant: DIEHL METERING GMBH, Ansbach (DE)

(72) Inventors: Roland Buckl, Arberg (DE);
Marc-Andrè Meier, Herrieden (DE);
Johannes Mueller, Absberg (DE);
Reiner Schuster, Colmberg (DE);
Edgar Vom Schloss, Rosstal (DE);
Frank Stefke, Gollhofen (DE)

(73) Assignee: Diehl Meterings GmbH, Ansbach (DE)

( * ) Notice: Subject to any disclaimer, the term of this patent is extended or adjusted under 35 U.S.C. 154(b) by 135 days.

(21) Appl. No.: 15/014,435

(22) Filed: Feb. 3, 2016

(65) Prior Publication Data

US 2016/0223374 A1   Aug. 4, 2016

(30) Foreign Application Priority Data

Feb. 3, 2015   (DE) .......................... 10 2015 001 379

(51) Int. Cl.
*G01K 17/10*   (2006.01)
*G01F 1/66*   (2006.01)
*G01K 17/12*   (2006.01)

(52) U.S. Cl.
CPC .............. *G01F 1/662* (2013.01); *G01F 1/665* (2013.01); *G01K 17/10* (2013.01); *G01K 17/12* (2013.01)

(58) Field of Classification Search
CPC ........ G01F 1/662; G01K 17/06; G01K 17/08; G01K 17/10; G01K 17/12; G01K 17/14; G01K 17/16; G01K 17/18; G01K 17/185
See application file for complete search history.

(56) References Cited

U.S. PATENT DOCUMENTS

| 4,245,501 A | * | 1/1981 | Feller ..................... G01K 17/16 165/11.1 |
| 7,328,624 B2 | | 2/2008 | Gysling et al. |

(Continued)

FOREIGN PATENT DOCUMENTS

| DE | 102007014810 B3 | 4/2008 |
| DE | 102008049891 A1 | 6/2010 |

(Continued)

*Primary Examiner* — Justin Olamit
(74) *Attorney, Agent, or Firm* — Laurence A. Greenberg; Werner H. Stemer; Ralph E. Locher

(57) ABSTRACT

A flow meter records a flow rate and/or an amount of heat of a flowing fluid. A control and evaluation unit ascertains flow rate data and the fitting-dependent direction of through flow is automatically ascertained. A temperature measuring device has first and second temperature sensors for ascertaining a temperature difference between a feed temperature in the feed and a return temperature in the return. The fitting location of the first and second temperature sensors in the feed or the return is automatically ascertained by the control and evaluation unit on the basis of the temperature difference. The control and evaluation unit is automatically configured during first-time or re-installation of the flow meter such that the direction of flow through the meter is adapted to the fitted direction of through flow and/or the temperature sensors are assigned to the feed and the return, respectively.

12 Claims, 6 Drawing Sheets

(56) References Cited

U.S. PATENT DOCUMENTS

| | | | |
|---|---|---|---|
| 9,528,865 B2* | 12/2016 | Freund | G01F 1/34 |
| 2008/0208483 A1 | 8/2008 | Loose et al. | |
| 2010/0084034 A1 | 4/2010 | Sonnenberg | |

FOREIGN PATENT DOCUMENTS

| | | |
|---|---|---|
| DE | 102010011272 A1 | 9/2011 |
| EP | 2000788 A1 | 12/2008 |
| EP | 2827111 A1 | 1/2015 |
| WO | 03087735 A1 | 10/2003 |
| WO | 2014180484 A1 | 11/2014 |

* cited by examiner

FLOW METER AND HEAT METER THAT AUTOMATICALLY DETERMINES FLOW DIRECTION

CROSS-REFERENCE TO RELATED APPLICATION

This application claims the priority, under 35 U.S.C. §119, of German application DE 10 2015 001 379.3, filed Feb. 3, 2015; the prior application is herewith incorporated by reference in its entirety.

BACKGROUND OF THE INVENTION

Field of the Invention

The present invention relates to a flow meter for recording the flow rate and/or the amount of heat of a flowing fluid for fitting into a supply line containing the fluid.

By means of flow meters it is possible to record the consumption of a fluid, for example of water. A heat meter makes it possible to record the energy, in the form of an amount of cold or amount of heat, that is delivered by the fluid as a transporting medium, for example water or a water-based fluidic mixture. Both flow meters and heat meters or cold meters (both referred to hereinafter as "energy meters") have to undergo calibration. To be able to record the through flow or the amount of heat or the amount of cold exactly, it is necessary that the flow meter or energy meter is fitted into the supply line correctly. Flow meters and energy meters have a marking of the direction of flow through the meter, usually provided on the connection housing of the flow meter, so that the fitter can install the flow meter in accordance with the direction of flow through the meter. Energy meters are usually installed in the so-called return, since they are subjected to a lower temperature there than in the feed. However, there are also fitting situations in which an energy meter is installed in the feed. This has the result that there are usually specific energy meters for the return and specific energy meters for the feed. However, any incorrect fitting of a flow meter or energy meter, whether with regard to the direction of through flow or with regard to it being fitted in the feed or the return, is often not immediately evident to the fitter, but only becomes apparent when data are first read out. Any removal of the fitted meter or rectification of the error is laborious and cost-intensive. Furthermore, energy meters for the feed and the return have to be kept in stock by installers, energy supply companies, resellers and distributors and local authorities. There are often instances of incorrect orders being placed or meter replacement measures being necessary.

A pertinent flow meter is described in German published patent application DE 10 2010 011 272 A1. That flow meter is based on the idea of establishing the direction of through flow from a positive or negative through flow and establishing the positive or negative temperature difference between the feed temperature and the return temperature and indicating this in the form of arrows on a display unit arranged on the energy meter. From this, the fitter identifies an incorrect installation of the energy meter with respect to the direction of through flow and an incorrect installation of the energy meter in the feed or the return. In view of this, the fitter can remove the fitted energy meter and install it again at the correct location and/or in the correct position. If an erroneous installation has taken place and it remains unnoticed, erroneous temperature data, in particular in the form of negative temperature differences, are stored in a memory by being independently recorded. This makes it possible to acquire erroneous data after the event and correct the measurement result in relation thereto.

German patent DE 10 2007 014 810 B3 discloses an energy meter in which amounts of heat or cold that are not properly recorded during the accounting period are stored in a secondary data memory and are used for a more accurate estimate of the actual energy consumption.

SUMMARY OF THE INVENTION

It is an object of the invention to provide a flow meter which overcomes the above-mentioned and other disadvantages of the heretofore-known devices and methods of this general type and which rules out incorrect installations with respect to the direction of fitting and/or the fitting location with respect to the feed and the return.

With the foregoing and other objects in view there is provided, in accordance with the invention, a flow meter for recording a flow rate and/or an amount of heat of a flowing fluid for fitting into a supply line containing the fluid, the flow meter comprising:

a measuring arrangement subjected to a through flow of the fluid with a direction of flow through the meter when the flow meter is operated in continuous operation;

a control and evaluation unit configured to control the measuring arrangement and ascertain flow rate data, the flow rate data enabling said control and evaluation unit to automatically ascertain a fitting-dependent direction of through flow as a fitted direction of through flow;

a temperature measuring device including a first temperature sensor and a second temperature sensor configured for ascertaining a temperature difference between a feed temperature in a feed and a return temperature in a return, wherein said control and evaluation unit automatically ascertains a fitting location of said first temperature sensor and said second temperature sensor in the feed or the return on a basis of the temperature difference;

said control and evaluation unit being automatically configured during a first-time installation or re-installation of the flow meter, in the continuous operation following the first-time installation or re-installation, to:

a) adapt a direction of flow through the meter to the fitted direction of through flow, so that the direction of flow through the meter and the fitted direction of through flow coincide; and/or b) assign the first temperature sensor and the second temperature sensor to the feed and to the return, respectively, depending on the measured temperature difference.

In other words, the control and evaluation unit of the novel flow meter is automatically configured, i.e. programmed, during first-time or re-installation of the flow meter in such a way that, in the continuous operation following the first-time installation or re-installation, the direction of flow through the meter is adapted to the fitted direction of through flow, and so the direction of flow through the meter and the fitted direction of through flow coincide.

Furthermore, in the case of the flow meter according to the invention, it is alternatively provided or provided in combination that the control and evaluation unit is automatically configured, i.e. programmed, during first-time or re-installation of the flow meter in such a way that, in the continuous operation following the first-time installation or re-installation, the first temperature sensor and the second temperature sensor are assigned to the feed and the return, respectively, in dependence on the measured temperature difference.

The present invention is based on the idea of not pre-defining the fitting situation of the flow meter with respect to the direction of through flow and/or the installation location (in the feed or in the return) on the device, but determining the actual fitting situation, created by the fitter, by the flow meter itself on the basis of the measurement data available to the flow meter. There is no longer any need for the fitted meter to be subsequently removed and re-fitted. Different devices do not have to be kept in stock. Rotatable or removable displays are no longer necessary. Independent data acquisition and evaluation of incorrect volumes of data as a result of incorrect installation during the accounting period is not necessary. This determined operational state can be secured by a calibration seal.

The flow meter is expediently constructed symmetrically in terms of flow. The measuring channel of the flow meter is consequently subjected to the same flow conditions in and against the direction of flow. As a result, the flow meter can also be turned by 180° and fitted into a supply line without the flow conditions, and consequently the metering, changing.

In particular, flow directing elements and/or flow screens and/or reflectors and/or holders and/or the inlet/outlet region and/or the inner wall that is in contact with the flow are provided in a symmetrical arrangement and/or formation and/or orientation in a housing of the flow meter, preferably in what is known as the connection housing, which is inserted into the supply line. To this extent, conditions that are symmetrical in terms of flow can be created in this way in the measuring channel of the flow meter.

The fact that the control and evaluation unit comprises a plausibility routine means that an unclear status (air in the line, backflows in the line, undefined conditions during flushing of the line, etc.) of the flow meter can be reliably ruled out at the beginning of the configuration.

Preferably, a recording of the through flow over a prescribed time tx can be performed in the course of the plausibility routine and it can thereby be established whether the measured through flow during this time period lies inside or outside prescribed limit values of the flow rate.

If the flow meter has a temperature measuring device, a recording of the temperature difference of the temperature sensors can be performed in the course of the plausibility routine. Preferably, a prescribed temperature difference may be provided for this purpose as a comparative value $\Delta T$.

If the control and evaluation unit comprises an alarm routine that can be activated by the control and if the plausibility routine is negative, the fitter receives an alarm on the device that the self-configuration has not yet proceeded correctly. In this case, it is expedient, for example, possibly to flush the pipeline once again, until a renewed self-configuration attempt is started.

As soon as the self-configuration has been carried out successfully, the adaptation of the direction of flow through the meter to the fitted direction of through flow and/or the assignment of the first temperature sensor and the second temperature sensor to the feed and the return, respectively, is unchangeably determined by the control and evaluation unit. This auto-installation can no longer be repeated thereafter, in order to prevent manipulations. The flow meter has then been transformed into the calibrated and unalterable operating state.

This is expediently a software-controlled process, in which the flow rate data and/or the temperature difference data, which are in any case available, are evaluated and information on the direction of through flow and/or the fitting location is generated.

Furthermore, a third temperature sensor, which is located on or in the housing of the flow meter, may be provided, the temperature difference being ascertained by measuring the temperature difference between the third temperature sensor and the first temperature sensor and also the temperature difference being ascertained by measuring the temperature difference between the third temperature sensor and the second temperature sensor in the course of the first-time or re-installation, and it being possible in dependence on this to establish the fitting location of the flow meter in the feed or the return.

Advantageously, one of the three temperature sensors may also be used for correcting the ascertained flow rate (temperature-related volume correction).

It may be provided here that, from the pair made up by the first temperature sensor and the second temperature sensor, the temperature sensor that has the smaller temperature difference with respect to the third temperature sensor is selected for the volume correction. The identification of this sensor may be indicated on a display unit, for example an LCD screen.

The fact that the automatic ascertainment of the through flow data and/or the temperature difference is deactivated once adaptation of the direction of through flow and/or the assignment of the temperature sensors has taken place means that the procedure is limited just to first-time installation or re-installation and a manipulation is therefore not possible. A renewed identifying routine or method is consequently only possible for a testing agency, and involves destroying or breaking the calibration seal.

It may be required in the course of the self-configuration to interchange the measurement data of the through flow for the adaptation of the direction of flow through the meter to the fitted direction of through flow and/or to interchange the measurement data of the temperature sensors for the assignment of the first temperature sensor and the second temperature sensor to the feed and the return, respectively. After the interchange, the measurement data then ascertained in continuous operation are correctly assigned to the respective actual direction of through flow and the respective temperature sensors. If the fitting situation is correct from the outset, the system "confirms" this state.

Other features which are considered as characteristic for the invention are set forth in the appended claims.

Although the invention is illustrated and described herein as embodied in a flow meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
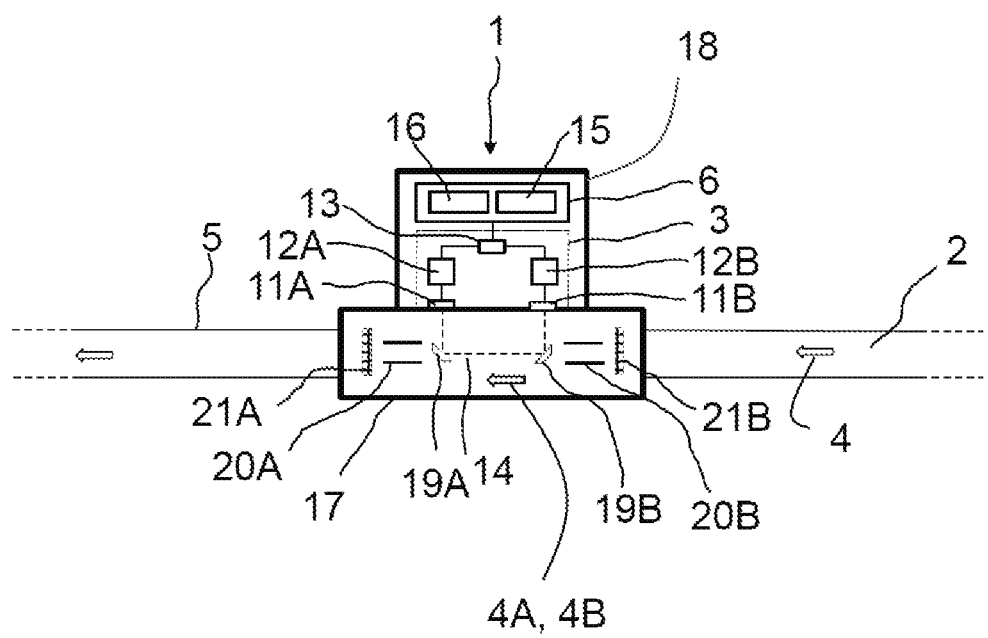
FIG. 1 shows a greatly simplified basic representation of a flow meter fitted in a supply line.

Referring now to the figures of the drawing in detail and first, particularly, to FIG. 1 thereof, there is shown a flow meter 1 according to the invention, which for recording the flow rate of a flowing fluid 2 is fitted into a supply line 5 containing the fluid 2.

The flow meter 1 comprises a housing 17, in particular a so-called measuring tube housing, which is flowed through by the fluid 2 with a direction of through flow 4 prevailing in the supply line 5. On the upper side of the housing 17 there is a first ultrasonic transducer 11A and a second ultrasonic transducer 11B, which together with a first reflector 19A and a second reflector 19B form a U-shaped measuring section 14. Likewise on the upper side of the housing 17 there is a measuring arrangement 3 and a control and evaluation unit 6, which controls the measuring arrangement 3 and ascertains flow rate data from the electrical signals originating from the measuring arrangement 3. The measuring arrangement 3 and the control and evaluation unit 6 may be accommodated in a common housing 18 (electronics housing).

The measurement of the flow rate takes place for example by the transit-time difference method. For this purpose, ultrasound signals are alternately emitted and received respectively by the first ultrasonic transducer 11A and the second ultrasonic transducer 11B, the difference in the transit time is established and the flow velocity of the fluid and the through flow volume are ascertained therefrom.

FIG. 1 also reveals that the flow meter 1 is constructed symmetrically in terms of flow and is accordingly subjected to the same flow conditions in and against the direction of through flow 4. It is consequently possible to fit the flow meter 1 both in the direction of through flow 4 and against the direction of through flow 4 without this making any difference in terms of flow.

For example, identical flow directing elements are provided both on the inlet side and on the outlet side, as illustrated by way of example in FIG. 1 by a first flow director 20A and an identical second flow director 20B. Furthermore, in addition to or instead of the flow directing elements, flow screens may be provided, for example in the form of a first screen 21A and an identical second screen 21B. The flow conditions are consequently always the same in the measuring section 14, irrespective of the fitting position, and so the fitting alignment cannot have any effects on the measurement result.

The measuring arrangement 3 comprises first and second signal processing modules, such as for example amplifiers 12A and 12B or the like. Furthermore, for connecting the respective ultrasonic transducer 11A, 11B to the control and evaluation unit 6 during operation, the measuring arrangement 3 has a changeover switch 13. The control and evaluation unit 6 may also comprise a processor 15 and a memory 16, including for storing the ascertained measured-value data. As can be seen from FIG. 1, the measuring arrangement 3 may also be constructed symmetrically.

The flow meter has a device-specifically prescribed direction of flow through the meter 4A. This direction of flow through the meter 4A corresponds to the installation of the direction of through flow 4 in the supply line 5 that is represented by way of example in FIG. 1. The flow meter is consequently fitted correctly from the beginning. According to the invention, the direction of flow through the meter 4A may coincide with the fitted direction of through flow 4B, as in FIG. 1, but does not have to.

According to the invention, during installation or re-installation, the direction of through flow of the installed flow meter 1 is automatically ascertained in the flow meter 1 by the control and evaluation unit 6 as the actual fitted direction of through flow 4B on the basis of flow rate data that are available in any case, in the course of a configuration routine, and are compared with the direction of flow through the meter 4A. If the directions of through flow coincide, the direction of flow through the meter 4A is retained. If, however, they do not coincide, the direction of flow through the meter 4A is adapted to the fitted direction of through flow 4B control-internally, without removal/re-fitting of the flow meter.

For this purpose, the operating parameters can as it were be turned around in the signal evaluation. On account of the symmetry in terms of flow, there are no resultant effects on the measurement result.

The flow meter 1 consequently adapts itself to the conditions ascertained in the first-time configuration and can subsequently go over directly into continuous operation. Accordingly, one and the same flow meter 1 can be fitted into the supply line 5 both in one direction and after being turned by 180°, and be used thus. To this extent, the stock keeping of corresponding flow meters can be significantly reduced.

Figure 4:
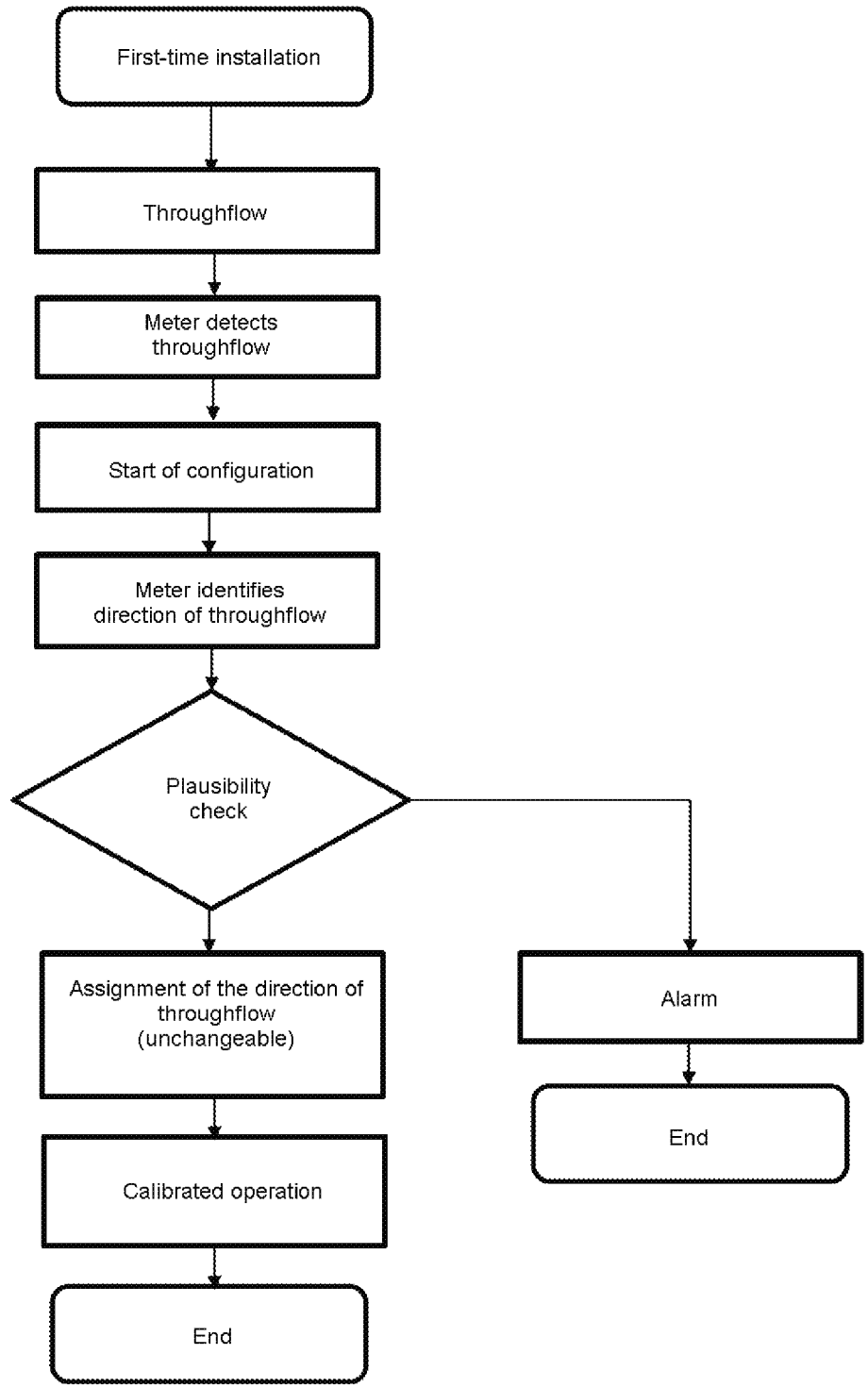
FIG. 4 shows a flow diagram for the automatic ascertainment of the direction of flow through a flow meter.

An example of the self-configuration for the flow meter 1 of FIG. 1 is shown in the flow diagram of FIG. 4. After the fitting of the flow meter 1 (first-time installation), the measuring tube of the flow meter 1 is flowed through for the first time by the fluid to be measured. The flow meter 1 detects the through flow and starts the configuration.

Figure 6:
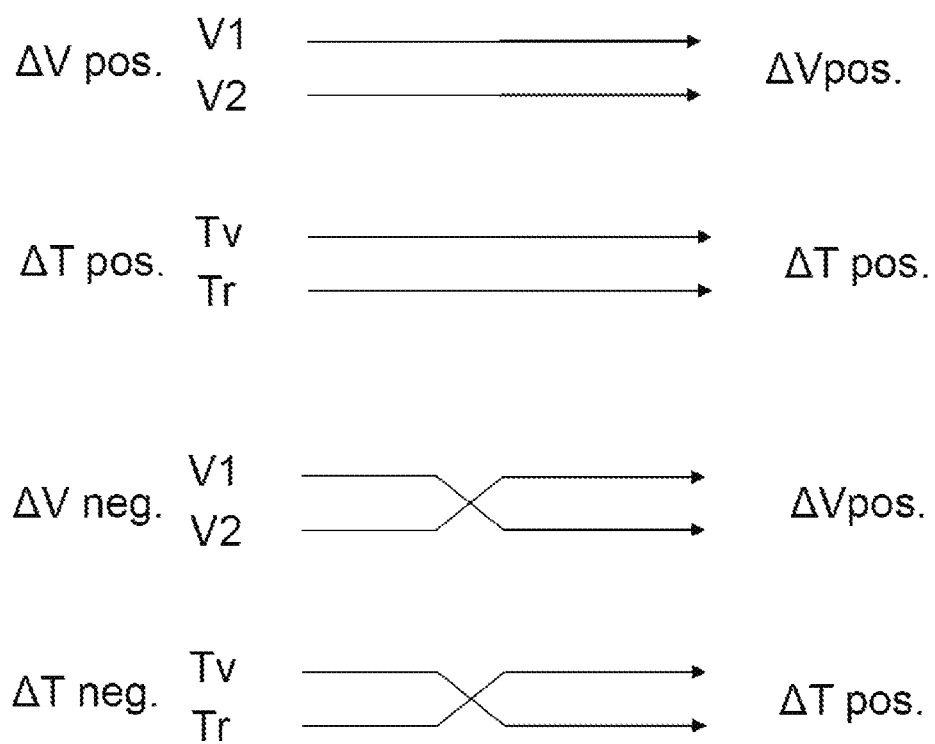
FIG. 6 shows a greatly simplified representation for explaining the possible automatic interchange of measurement data.

The item "meter identifies direction of through flow" means that the adaptation of the direction of flow through the meter 4A to the fitted direction of through flow 4B is performed on the basis of the sign of the measured difference in volume $V1-V2=\Delta V$ in one direction and the other, and so the direction of flow through the meter 4A and the fitted direction of through flow 4B coincide. If the ascertained difference in volume is negative ($\Delta V$ neg.), the assignment of the through flow data $V1$, $V2$ is interchanged in the data processing. If the measured difference in volume is positive ($\Delta V$ pos.), the assignment of the through flow data $V1$, $V2$ remains unchanged (cf. in each case FIG. 6).

Once the meter has identified the direction of through flow, the control and evaluation unit checks the data or the assignment of the through flow data for plausibility. Obvious errors or unclear readings, for example due to air or back-flows in the line, can thereby be ruled out. The plausibility routine comprises for example a recording of the through flow over a prescribed time tx. For example, a check is performed as to whether the direction of through flow and/or the flow rate remains the same within prescribed limits over the time tx.

If the plausibility routine is negative, an alarm takes place and/or the configuration routine is aborted. Further measures, such as for example flushing of the supply line 5, may possibly have to be performed. If, however, the plausibility check is positive, the adaptation of the direction of flow through the meter 4A to the fitted direction of through flow 4B is determined unchangeably on the part of the system for continuous operation. In this state, the flow meter may preferably also be calibrated.

Figure 2:
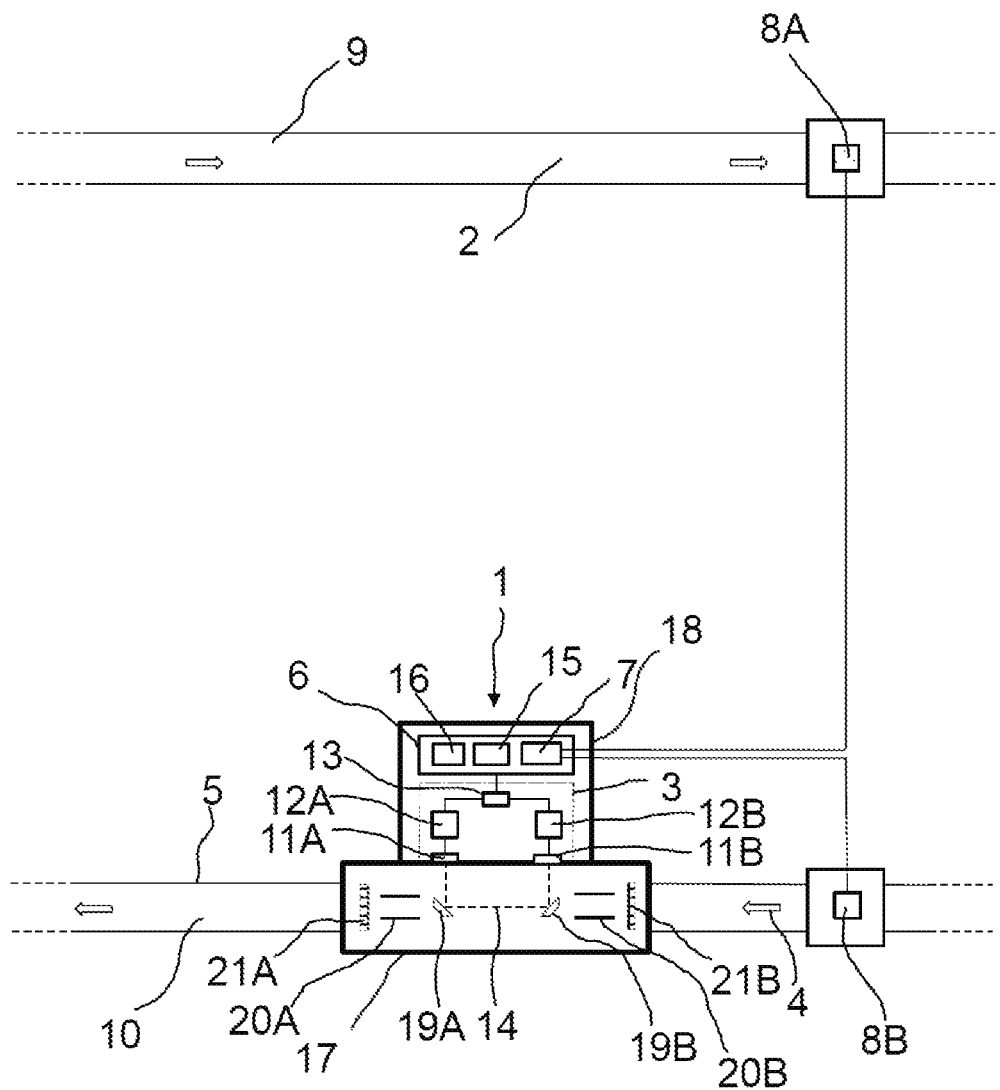
FIG. 2 shows a greatly simplified basic representation of a flow meter fitted in a return.
Figure 3:
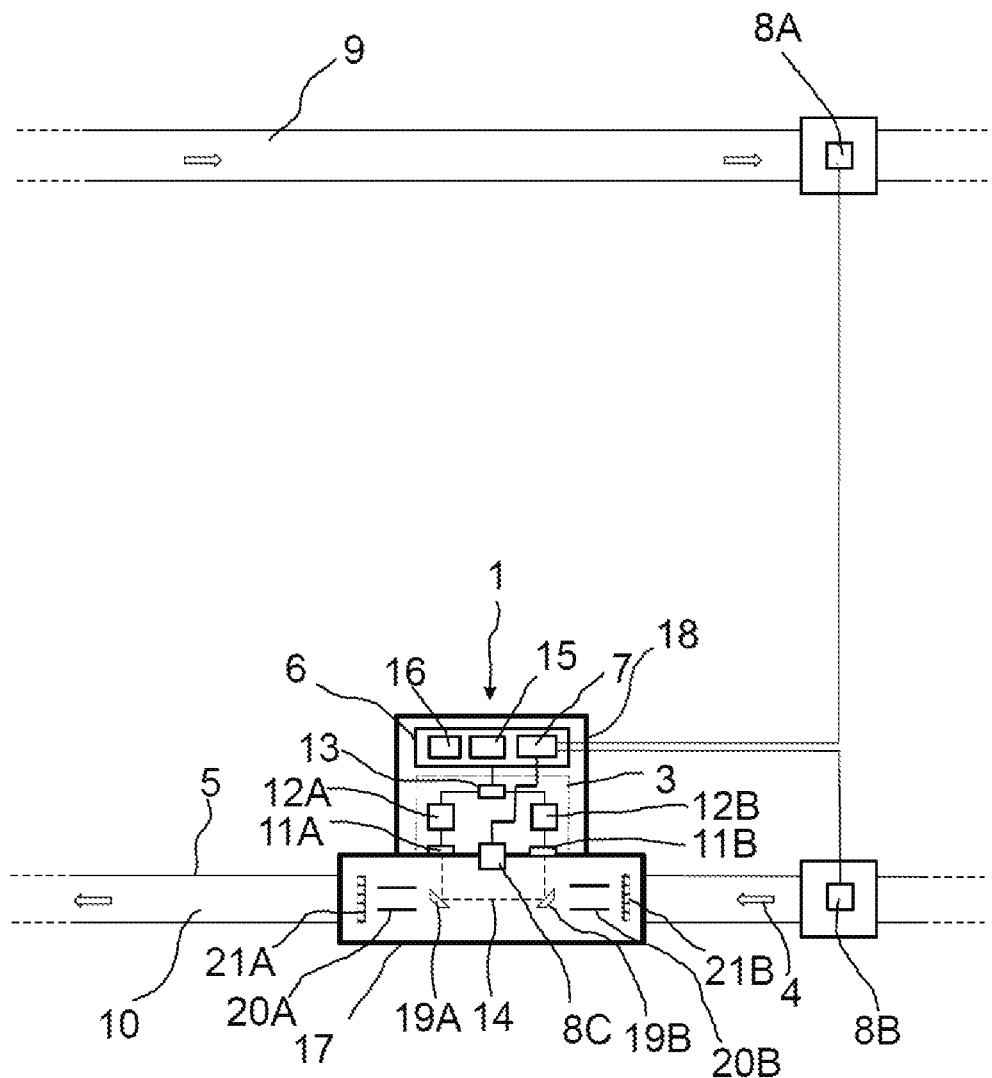
FIG. 3 shows a greatly simplified basic representation of a flow meter with a third temperature sensor fitted in a return.

The flow meter in FIG. 2 differs from the flow meter in FIG. 1 in that a temperature measuring device 7 is additionally provided. This flow meter 1 consequently operates as a heat or energy meter. The temperature measuring device 7 comprises a first temperature sensor 8A and a second temperature sensor 8B, the first temperature sensor 8A and the second temperature sensor 8B being provided for ascertaining a temperature difference between a feed temperature in the feed 9 and a return temperature in the return 10. The fitting location of the first temperature sensor 8A and the second temperature sensor 8B in the feed or the return can be automatically ascertained by the control and evaluation unit 6 on the basis of the temperature difference.

Accordingly, during installation or re-installation, an assignment of the temperature sensors 8A, 8B to the feed 9 and the return 10, respectively, can be determined in the flow meter 1 by the control and evaluation unit 6 by including the ascertained temperature data, for example the temperature difference, in the course of a configuration routine.

Figure 5:
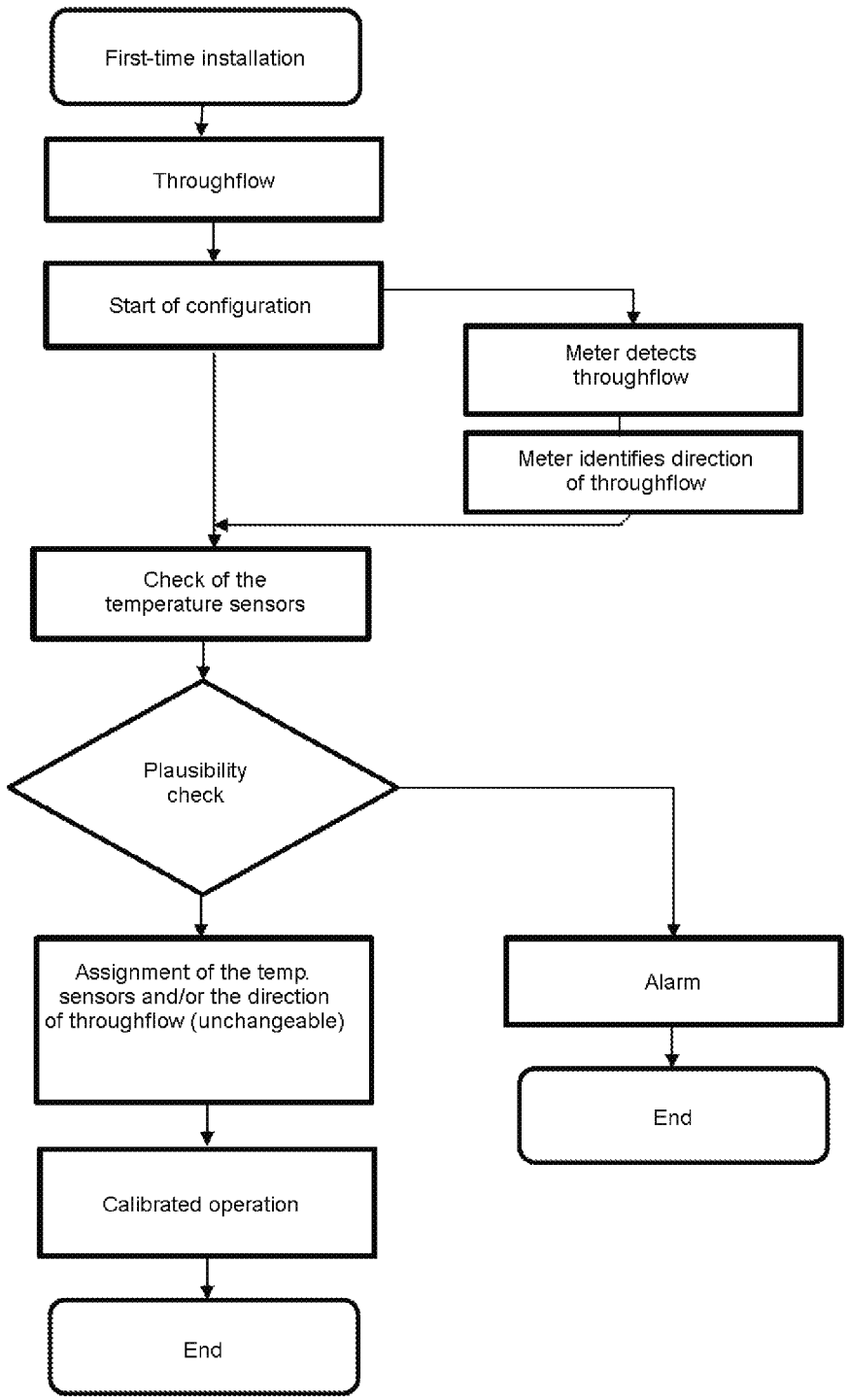
FIG. 5 is a flow diagram relating to the assignment of the temperature sensors and/or the direction of through flow and also for the ascertainment of the fitting location of a flow meter.

In the associated flow diagram according to FIG. 5, the start of the configuration is either also followed—as in the case of the sequence according to FIG. 4—by the identification of the through flow and then a check of the temperature sensors 8A, 8B or followed by a check of the temperature sensors 8A, 8B right away. The "check of the temperature sensors" means that the assignment of the first temperature sensor 8A and the second temperature sensor 8B to the feed 9 and the return 10, respectively, is performed on the basis of the measured temperature difference ΔT between the temperature sensors 8A and 8B. If, for example, the measured value of the ascertained temperature difference is negative (ΔT neg.), the assignment of the temperature sensors 8A, 8B with respect to the feed 9 and the return 10 is interchanged. If, for example, the measured value of the ascertained temperature difference ΔT is positive (ΔT pos.), the assignment of the temperature sensors 8A, 8B with respect to the feed 9 and the return 10 remains unchanged (cf. in each case FIG. 6).

Here, too, this is followed by a plausibility check. The plausibility routine may, for example, comprise the comparison of a measured temperature difference ΔT with a prescribed temperature difference. For example, measured values with a measured temperature difference of for example ΔT>3 K may be assigned as plausible.

If the plausibility check is positive, the assignment of the first and second temperature sensors 8A, 8B is determined unchangeably on the part of the system for continuous operation. In this state, the flow meter may preferably also be calibrated. If the plausibility check is negative, an alarm takes place.

The two possibilities of independent configuration, that is to say the automatic identification and adaptation of the direction of through flow and the assignment of the temperature sensors, may either both be performed together (cf. FIG. 5) or else each be performed alternatively on their own.

In any event, the flow meter adapts itself to the measured values ascertained in the first-time configuration and can subsequently go over directly into continuous operation. Re-fitting of the flow meter and/or the temperature sensors 8A, 8B is not required.

If the assignment of the temperature sensors 8A, 8B to the flow meter 1 or to the inputs or ports of the temperature measuring device 7 is known, the fitting location of the flow meter 1 in the feed 9 or the return 10 can also be deduced from the temperature difference and this can also be included in the configuration. After the independent configuration, the flow meter can be transformed into the calibrated and unalterable operating state.

The following is a summary list of reference numerals and the corresponding structure used in the above description of the invention:

1 flow meter
2 fluid
3 measuring arrangement
4 direction of through flow
4A direction of flow through the meter
4B fitted direction of through flow
5 supply line
6 control and evaluation unit
7 temperature measuring device
8A first temperature sensor
8B second temperature sensor
8C third temperature sensor
9 feed
10 return
11A first ultrasonic transducer
11B second ultrasonic transducer
12A first amplifier
12B second amplifier
13 changeover switch
14 measuring section
15 processor
16 memory
17 housing
18 housing
19A first reflector
19B second reflector
20A first flow director
20B second flow director
21A first screen
21B second screen

The invention claimed is:

1. A flow meter for recording a flow rate and/or an amount of heat of a flowing fluid for fitting into a supply line containing the fluid, the flow meter comprising:
  a housing subjected to a through flow of the fluid with a direction of flow through the meter when the flow meter is operated in continuous operation;
  a measuring section configured to measure the through flow of fluid to obtain flow rate data;
  a control and evaluation unit configured to automatically ascertain a fitting-dependent direction of through flow as a fitted direction of through flow based on the flow rate data;
  a temperature measuring device including a first temperature sensor and a second temperature sensor configured for ascertaining a temperature difference between a feed temperature in a feed and a return temperature in a return, wherein said control and evaluation unit automatically ascertains a fitting location of said first temperature sensor and said second temperature sensor in the feed or the return on a basis of the temperature difference;

said control and evaluation unit being automatically configured during a first-time installation or re-installation of the flow meter, in the continuous operation following the first-time installation or re-installation, to:

(a) adapt a direction of flow through the meter to the fitted direction of through flow, so that the direction of flow through the meter and the fitted direction of through flow coincide; and/or (b) assign the first temperature sensor and the second temperature sensor to the feed and to the return, respectively, depending on the measured temperature difference, wherein the housing comprises elements selected from the group consisting of flow directing elements, flow screens, and reflectors disposed in a symmetrical arrangement and/or formation in said housing with respect to flow direction.

2. The flow meter according to claim 1, wherein said control and evaluation unit is configured to process a plausibility routine.

3. The flow meter according to claim 2, wherein the plausibility routine comprises a recording of the through flow over a prescribed time tx.

4. The flow meter according to claim 2, wherein the plausibility routine comprises a recording of a prescribed temperature difference $\Delta T$.

5. The flow meter according to claim 2, wherein said control and evaluation unit comprises an alarm routine to be activated if the plausibility routine is negative.

6. The flow meter according to claim 1, wherein said control and evaluation unit is configured to unchangeably determine an adaptation of the direction of flow through the meter to the fitted direction of through flow and/or an assignment of the first temperature sensor and the second temperature sensor to the feed and the return, respectively, during the first-time installation or re-installation.

7. The flow meter according to claim 1, wherein an adaptation of the direction of flow through the meter to the fitted direction of through flow and/or an assignment of the first temperature sensor and the second temperature sensor to the feed and the return, respectively, by said control and evaluation unit during the first-time installation or re-installation is a software-controlled process, in which the flow rate data and/or the temperature difference are evaluated and information on the direction of through flow and/or the fitting location is generated.

8. The flow meter according to claim 1, which comprises a third temperature sensor, disposed on or in a housing of the flow meter, and wherein the temperature difference is ascertained by measuring a temperature difference between said third temperature sensor and said first temperature sensor and also the temperature difference is ascertained by measuring a temperature difference between said third temperature sensor and said second temperature sensor in a course of the first-time installation or re-installation.

9. The flow meter according to claim 8, wherein one of said temperature sensors is used for correcting the ascertained flow rate.

10. The flow meter according to claim 8, wherein from a sensor pair comprising the first temperature sensor and the second temperature sensor, the temperature sensor that has a smaller temperature difference with respect to the third temperature sensor is selected for volume correction.

11. The flow meter according to claim 8, wherein said control and evaluation unit is configured to deactivate automatic ascertainment of the through flow data and/or the temperature difference once adaptation of the direction of through flow and/or the assignment of the temperature sensors has taken place.

12. The flow meter according to claim 8, wherein, during a self-configuration, measurement data of the through flow for the adaptation of the direction of flow through the meter to the fitted direction of through flow are interchanged and/or measurement data of the temperature sensors for the assignment of the first temperature sensor and the second temperature sensor to the feed and the return, respectively, are interchanged.

* * * * *